United States Patent
White et al.

(10) Patent No.: US 7,265,312 B2
(45) Date of Patent: Sep. 4, 2007

(54) BATTERY PACK AND METHOD FOR CONSTRUCTING SAME

(75) Inventors: Daniel J. White, Baltimore, MD (US); Paul S. White, Ellicott City, MD (US); Adam M. Casalena, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 624 days.

(21) Appl. No.: 10/643,383

(22) Filed: Aug. 19, 2003

(65) Prior Publication Data

US 2004/0040937 A1  Mar. 4, 2004

Related U.S. Application Data

(63) Continuation of application No. 10/183,296, filed on Jun. 27, 2002, now Pat. No. 6,645,669.

(60) Provisional application No. 60/303,496, filed on Jul. 6, 2001, now abandoned.

(51) Int. Cl.
 *B23K 11/00* (2006.01)
(52) U.S. Cl. ................................. 219/56.22; 219/117.1
(58) Field of Classification Search ............. 219/56.1, 219/56.21, 56.22, 117.1
See application file for complete search history.

(56) References Cited

U.S. PATENT DOCUMENTS 3,810,790 A * 5/1974 Denis ...................... 219/56.22
4,322,597 A * 3/1982 Hooke ........................ 219/91.1
5,298,712 A * 3/1994 Alexandres .............. 219/56.22

FOREIGN PATENT DOCUMENTS

| FR | 1294827 A | 6/1962 |
| GB | 1359747 A | 7/1974 |
| JP | 07050157 A | 2/1995 |
| JP | 10027599 A | 1/1998 |
| JP | 10050281 A | 2/1998 |

OTHER PUBLICATIONS

J-P Clement, European Search Report of Application No. EP02014782, Sep. 25, 2003, Berlin.

J-P Clement, Annex to the European Search Report on European Patent Application No. EP02014782, Sep. 25, 2003, Berlin.

* cited by examiner

*Primary Examiner*—Clifford C. Shaw
(74) *Attorney, Agent, or Firm*—Adan Ayala

(57) ABSTRACT

An improved battery pack is proposed. The battery pack includes a housing, and first and second cells disposed in the housing, the first cell having a radius and a periphery. In addition, the battery pack includes a metal strap connecting the first and second cells, the strap having an end disposed over the first cell and a portion of the periphery, and two contact protrusions contacting the first cell, wherein distance between the strap end and the overlaped periphery is greater than the radius of the first cell.

3 Claims, 2 Drawing Sheets

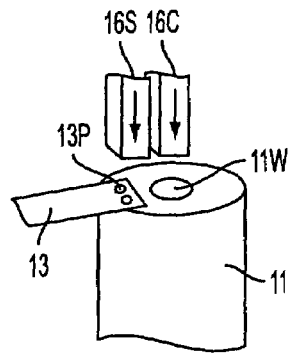 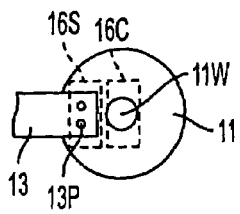 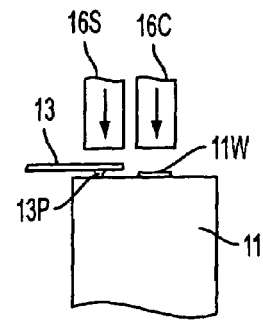
FIG. 1A PRIOR ART
FIG. 1B PRIOR ART
FIG. 1C PRIOR ART
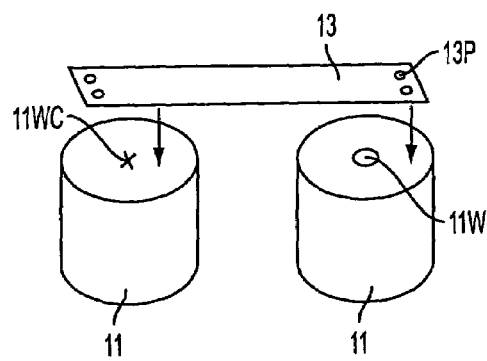 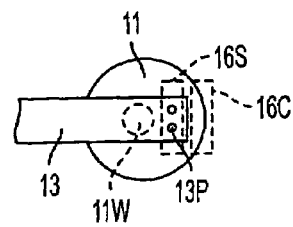
FIG. 2A
FIG. 2B
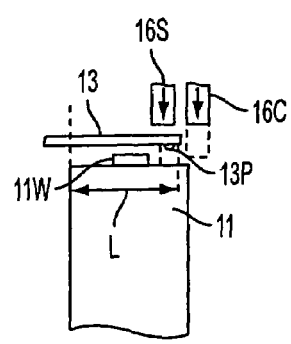 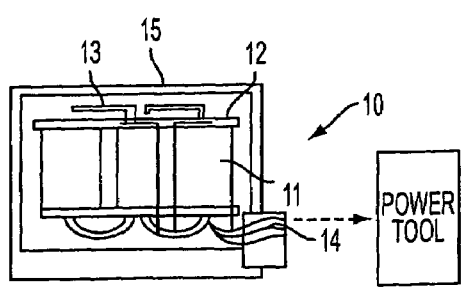
FIG. 2C
FIG. 3

BATTERY PACK AND METHOD FOR CONSTRUCTING SAME

CROSS-REFERENCE TO RELATED APPLICATIONS

The present application is a continuation of U.S. patent application Ser. No. 10/183,296, filed on Jun. 27, 2002, now U.S. Pat. No. 6,645,669, which in turn derives priority under 35 USC § 119(e) from U.S. application Ser. No. 60/303,496, filed Jul. 6, 2001, now abandoned.

BACKGROUND OF THE INVENTION

The present invention relates to battery packs and a method for constructing the same.

Referring to FIG. 3, battery pack 10 typically has rechargeable cells 11 connected in series and/or parallel via connectors, such as metal straps 13. The cells 11 may be held together by a plenum or plate 12. The straps 13 may be disposed between the plate 12 and cells 11. Alternatively, plate 12 may be disposed between cells 11 and straps 13, whereas the straps 13 contact the cells 11 through holes in plate 12.

This assembly is then disposed in a housing 15. Cables or wires connected to cells 11 may extend into a terminal block 14, which allows the battery pack 10 to be connected to electric and/or electronic devices such as power tools, chargers, cellular telephones, etc.

Referring to FIGS. 1 and 3, typical cells 11 include cells produced by Sanyo Energy, such as model no. N2400. Such cells 11 may have weld area 11W, where the negative collector inside the cell is welded to the exterior can during the production of cell 11. This process may be done from the outside of the cell 11 using a laser. After the weld is completed, a weld area 11W having a diameter of about 4 or 5 millimeters is left. This weld area 11W may be sensitive to exterior pressure, heat, and electrical current.

During the construction of battery pack 10, cells 11 are typically welded together using double protrusion nickel straps 13, which have protrusions 13P. During the welding process, a strap electrode 16S is disposed on strap 13 while cell electrode 16 contacts the cell 11 directly. Current is passed through strap electrode 16S, strap 13 and out the cell 11 into cell electrode 16C, resulting in heat and finally welding.

This is problematic because cell electrode 16C partially or completely contacts weld area 11W of cell 11. This welding process may result in early cell failure.

SUMMARY OF THE INVENTION

An improved battery pack is proposed. The battery pack comprises a housing, and first and second cells disposed in the housing, the first cell having a radius and a periphery. In addition, the battery pack comprises a metal strap connecting the first and second cells, the strap having an end disposed over the first cell and a portion of the periphery, and two contact protrusions contacting the first cell, wherein distance between the strap end and the overlaped periphery is greater than the radius of the first cell.

Also disclosed is a method for manufacturing a battery pack comprising the steps of providing two cells, at least one cell having a weld area, welding a strap therebetween, and disposing the cells in a housing, wherein the strap is welded by disposing a first electrode on the strap and a second electrode on the at least one cell outside of the weld area, and providing a current between the first and second electrodes.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 illustrates a prior art welding process, where FIG. 1A shows a perspective view of the welding process, FIG. 1B shows a partial top plan view of the welding process, and FIG. 1C shows a side view of the welding process;

FIG. 2 illustrates the welding process according to the present invention, where FIG. 2A is a perspective view of the welding process according to the invention, FIG. 2B is a partial top plan view of the welding process according to the invention, and FIG. 2C is a side view of the welding process according to the invention;

FIG. 3 illustrates a typical battery pack; and

FIG. 4 illustrates alternate embodiments of the present invention, where

DETAILED DESCRIPTION

Figure 4A:
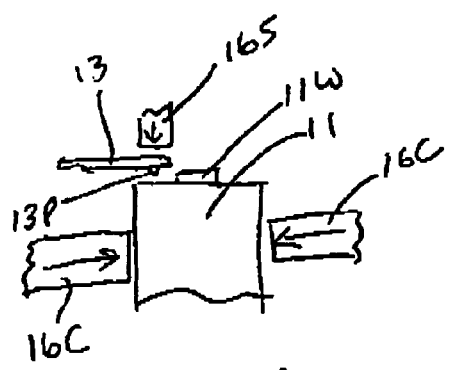
FIG. 4A is a side view of a second embodiment according to the present invention and FIG. 4B is a side view of a third embodiment according to the invention.
Figure 4B:
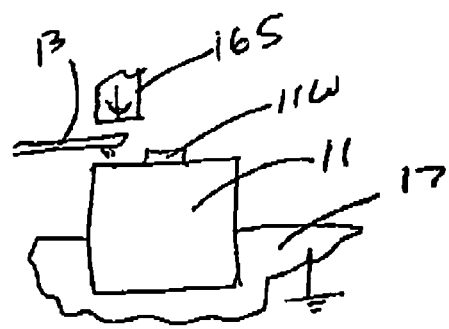

The following embodiments for the battery pack and methods for manufacturing the same are described below, persons skilled in the art should recognize that like numerals refer to like parts.

FIGS. 2-3 illustrate a first embodiment of the present invention. In this embodiment, rechargeable cells 11 are connected by straps 13. Persons skilled in the art should recognize that cell 11 may be nickel metal-hydride (NiMH) or nickel-cadmium (NiCd) cell.

As in the prior art, cells 11 may be connected in series and/or parallel. The cells 11 may then be held together by a plate 12. The straps 13 may be disposed between the plate 12 and cells 11. Alternatively, plate 12 may be disposed between cells 11 and straps 13, whereas the straps 13 contact the cells 11 through holes in plate 12.

Preferably, strap 13 with protrusions 13P is welded onto cell 11. As in the prior art, the strap electrode 16S is disposed on the strap 13. Cell electrode 16C however is disposed on an area of cell 11 outside of weld area 11W. Preferably, this area is near the periphery of the top surface of the cell 11.

Persons skilled in the art should recognize that it may be preferable to increase the length of strap 13 in order to provide a position for contact electrode 16C outside of the weld area 11W. Accordingly, if length L is defined as the distance between one end of strap 13 and the periphery of cell 11 (see FIG. 2C), length L is preferably larger than the radius of cell 11.

Persons skilled in the art should also recognize that it may be preferable to increasing the length of strap 13 so that its length is longer than the distance between the two centers of adjacent cells (11W and/or 11WC in FIG. 2A). This could also result in longer battery life. This is because, with a longer strap 13, any axial movement of cell 11 due to vibration will result in a smaller angle of movement for the strap 13 between the start and end positions of cell 11. This would decrease fatigue wear on strap 13, increasing battery life.

This assembly is then disposed in a housing 15. Cables or wires connected to cells 11 may extend into a terminal block 14, which allows the battery pack 10 to be connected to electric and/or electronic devices such as power tools, chargers, cellular telephones, etc.

Persons skilled in the art should recognize that other alternatives to this method of construction area available. For example, referring to FIG. 4A, cell electrodes 16C may be disposed on the side of cell 11. Alternatively, cell 11 may be disposed in a fixture 17 which may be grounded. This would provide a exit path for current going through strap electrode 16S, strap 13 and cell 11.

Persons skilled in the art may recognize other alternatives to the means disclosed herein. However, all these additions and/or alterations are considered to be equivalents of the present invention.

We claim:

1. A method for manufacturing a battery pack comprising the steps of:
   providing a housing and two cells, at least one cell having a weld area;
   welding a strap between the two cells; and
   disposing the cells in the housing,
   wherein the strap is welded by disposing a first electrode on the strap outside of the weld area and a second electrode on the at least one cell outside of the weld area, and providing a current between the first and second electrodes.

2. The method of claim 1, wherein the second electrode contacts a side of the at least one cell.

3. The method of claim 1, wherein the second electrode contacts a periphery of the at least one cell.

\* \* \* \* \*